(12) United States Patent
Harvey (10) Patent No.: US 7,624,096 B1
(45) Date of Patent: Nov. 24, 2009

(54) METHOD OF AMENDING DATABASE CONTENTS

(75) Inventor: Richard Hans Harvey, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 204 days.

(21) Appl. No.: 09/721,639

(22) Filed: Nov. 24, 2000

(30) Foreign Application Priority Data

Nov. 26, 1999 (AU) .................................. PQ4285

(51) Int. Cl.
G06F 7/00 (2006.01)
(52) U.S. Cl. .......................................... 707/3; 707/102
(58) Field of Classification Search ............... 707/1–10, 707/100–102; 705/7
See application file for complete search history.

(56) References Cited

U.S. PATENT DOCUMENTS

| | | | |
|---|---|---|---|
| 5,349,170 A | | 9/1994 | Kern |
| 5,432,931 A | | 7/1995 | Woess et al. |
| 5,768,416 A | | 6/1998 | Lech et al. |
| 5,899,988 A | | 5/1999 | Depledge et al. ............... 707/3 |
| 5,956,705 A | | 9/1999 | Stevens et al. ................. 707/2 |
| 5,987,446 A | | 11/1999 | Corey et al. |
| 6,006,331 A | * | 12/1999 | Chu et al. ..................... 713/201 |
| 6,085,188 A | * | 7/2000 | Bachmann et al. ............. 707/3 |
| 6,122,627 A | | 9/2000 | Carey et al. |
| 6,157,925 A | * | 12/2000 | Jenkins et al. ................. 707/10 |
| 6,345,266 B1 | * | 2/2002 | Ganguly et al. ................ 707/1 |
| 6,347,312 B1 | * | 2/2002 | Byrne et al. .................... 707/3 |
| 6,629,132 B1 | * | 9/2003 | Ganguly et al. ............. 709/213 |
| 6,892,185 B1 | * | 5/2005 | Van Etten et al. ........... 707/100 |

2002/0038228 A1 * 3/2002 Waldorf et al. .............. 709/205

FOREIGN PATENT DOCUMENTS

| | | |
|---|---|---|
| EP | 0420425 | 4/1991 |
| EP | 0593062 | 4/1994 |
| FR | 2749685 | 12/1997 |

OTHER PUBLICATIONS

IBM Technical Disclosure Bulletin, "Extensible and Configurable Audit Event Types and Class", Jan. 1, 1992, IBM-US Bulletin, 34, pp. 138-141.*

(Continued)

*Primary Examiner*—Sathyanarayan Pannala
(74) *Attorney, Agent, or Firm*—Baker Botts L.L.P.

(57) ABSTRACT

A method and database system for improving the operational performance of a database are provided. The method includes determining whether an instruction or operation adds information to or removes information from the database. For an add operation, information is first added to an 'out' table used to retrieve objects (or entries) before the database is actually updated. For a remove operation, information is first removed from an 'in' table used to find objects in the database. Preferably, for an add operation, the information is added to the 'in' table after the 'out' table, and for a remove operation, information is preferably removed from the 'out' table after the 'in' table.

11 Claims, 3 Drawing Sheets

OTHER PUBLICATIONS

Nations et al., "Some DML Instruction Sequences for Application Program Analysis and Conversion", May 1978, Proceedings of 1978 ACM SIGMOD Intenational Conference on Management of Data, 120-131.*

Harinath et al., "Experiences with an Object Oriented Framework for Distributed Control Applications", Mar. 2000, ACM, Inc., pp. 1-5.*

Leung, C.M.R., "GDSA: An X.500 Directory Implementation Supporting Heterogeneous Databases", Apr. 1991, The first Australian Conference on Telecommunications Software, pp. 85-96.*

* cited by examiner

METHOD OF AMENDING DATABASE CONTENTS

BACKGROUND

1. Field

The present application relates to the operational performance of a database, particularly its performance when the contents of the database are being altered. The present application has one, but not its only, application to a relational database, and more particularly a directory services database. In a further form, the invention relates to the performance of a database utilized in providing directory services. The invention, however, should not be limited to only this application.

2. Description of the Related Art

A part of the problem which the present invention seeks to address, stems from a known situation in databases called "database isolation levels". Isolation levels allow a user to specify an appropriate compromise between consistency and concurrency. This feature makes it possible to increase concurrency when the consistency and accuracy of the data is not essential.

Many databases support four isolation levels as defined by the ANSI/ISO SQL92 standard. These levels are Read Uncommitted (RU), Read Committed (RC), Repeatable Read (RR) and Serializable.

The highest degree of isolation is called "Serializable", since the concurrent execution of serializable transactions is equivalent to a serial execution of the transactions. The Serializable level offers the highest degree of protection to the application programmer, i.e., high isolation. However, such high isolation often results in a lower degree of concurrency. At lower degrees of isolation, more transactions may run concurrently, but it can also introduce some inconsistencies in the data. The ANSI/ISO SQL92 standard identifies three inconsistencies that can occur during the execution of concurrent transaction:

1. "Dirty read": A transaction T1 modifies a row. A transaction T2 then reads that row before T1 performs a COMMIT. If T1 then performs a ROLLBACK, T2 will have read a row that was never committed and that may thus be considered to have never existed.

2. "Non-repeatable read": A transaction T1 reads a row. A transaction T2 then modifies or deletes that row and performs a COMMIT. If T1 then attempts to reread that row, it may receive the modified value or discover that the row has been deleted.

3. "Phantom rows": A transaction T1 reads a set of rows N that satisfy some <search condition>. A transaction T2 then executes SQL statements (or instructions) that generate one or more rows that satisfy the <search condition> used by transaction T1. If transaction T1 then repeats the initial read with the same <search condition>, it obtains a different collection of rows.

Table I below shows how the ANSI/ISO SQL92 standard defines which inconsistencies are possible (Yes) and which are not (No) for a given isolation level.

TABLE I

|  | Dirty Read | Non-repeatable Read | Phantom rows |
| --- | --- | --- | --- |
| READ UNCOMMITTED | Yes | Yes | Yes |
| READ COMMITTED | No | Yes | Yes |
| REPEATABLE READ | No | No | Yes |
| SERIALIZABLE | No | No | No |

Thus it can be seen that the "Serializable" level provides the highest isolation and the least possibility of inconsistencies, but, as noted above, this often results in the lowest level of performance. Conversely, the "read uncommitted" level which provides the lowest isolation and the highest possibility of inconsistencies, often results in the highest level of performance.

One reason isolation levels are an issue can be illustrated as follows. When using a database, there may be one user wanting to update a row and another user wanting to read the same row. Depending on the isolation level selected, a database may lock a row when a row is being updated and thus the row cannot be read. This may not seem to be a major problem with only one user, but when there are many users, even thousands of users wanting to read a database, such a 'lock' is found to be extremely wasteful of a users time. If the update takes a long time, this only exacerbates the problem of delaying the read by the other users.

One way around this problem is to allow reads and updates to go on concurrently, by selecting a lower isolation level. But this then leads to other problems. If the read is not locked during an update, the read function may be a "dirty read" on what is called a "dirty page" i.e. something may be read that is in the middle of being changed. To illustrate this problem, imagine in a payroll database, a first application is going through the database and increasing every payroll entry by 10%, while concurrently a second application is reading the database. If the first application had updated half the database entries and the second application had read all the database entries and had performed a sum operation to check the validity of the read, it would be found to be neither pre-value nor post-value. In essence, half the database had been updated by 10% and the other half would not yet have been updated by 10% at the time the read operation occurred. So, in that particular instance, it may be considered more appropriate to run at a higher isolation level, but then again the performance or speed of a read will be reduced if the read is conducted at the higher isolation level.

Figure 1:
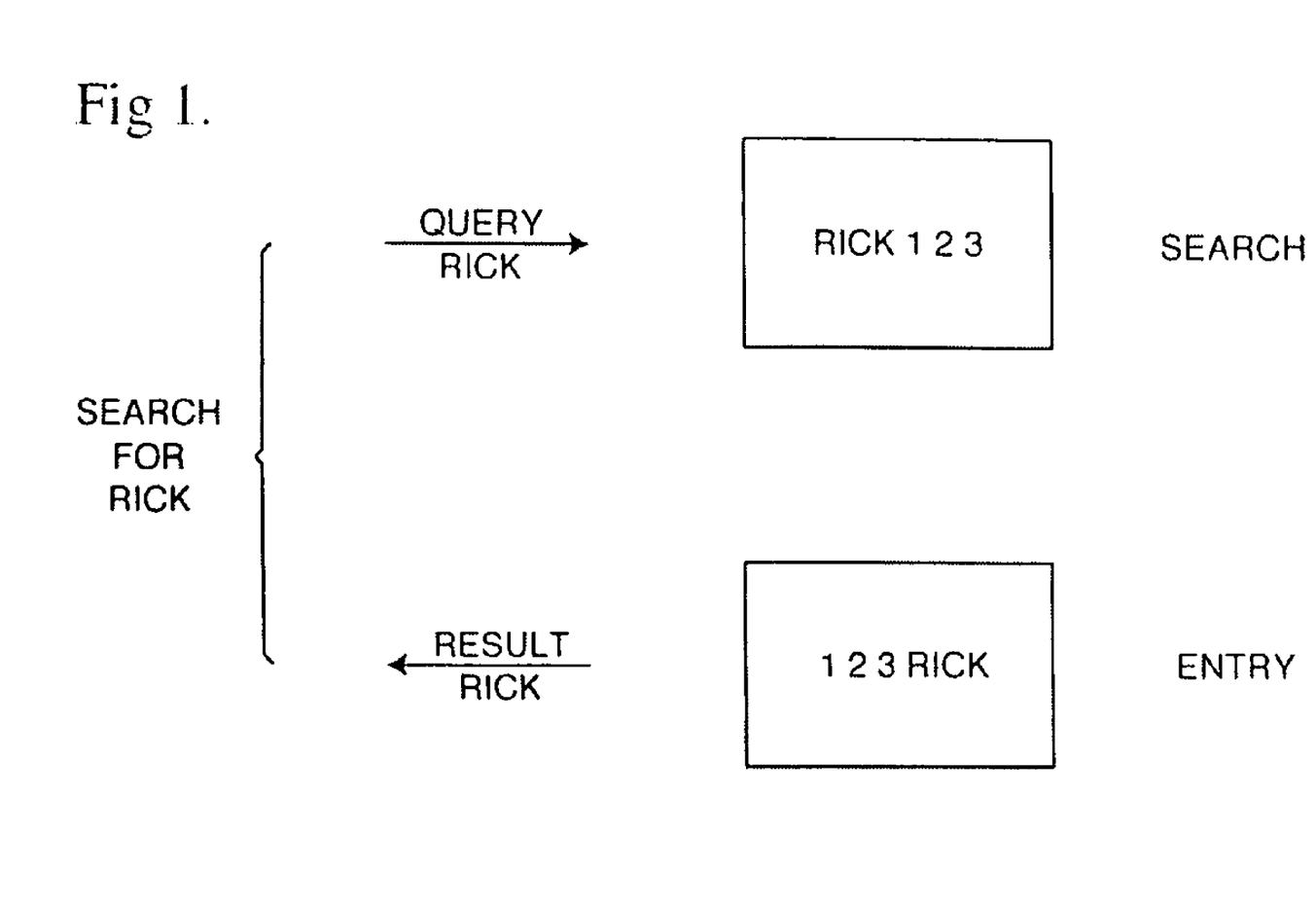
FIG. 1 illustrates 'in'/'out' table structure.

In a directory services environment, which is usually a database/application that requires relatively high performance, the database/application deals with 'objects' and a metadata design. The directory system can be set at a relatively low isolation level in order to improve performance. But at the lower isolation levels, as illustrated above, the 'dirty read' problem can exist. The design of some directory systems utilize a table structure which includes, in effect, 'in' tables and 'out' tables. FIG. 1 illustrates this.

The idea behind using an 'in' table and 'out' table structure, is that a search can be conducted on an 'in' table, a search table for example, and the results of that search can be based on an 'out' table, an entry table for example. In FIG. 1, lets say a search for Rick is called for. A search will find that Rick is entry No. 123 and then the result, from the entry table, is read from entry 123 together with the stored information associated with that entry.

Information in these tables may be included by adding rows to the search table, to the entry table and to other selected tables. The information may also be stored in a raw form and/or a normalized form. However, if before the process of adding rows is completed, a read is performed not all the information that is being added to the entry table would be returned because not all the information had yet been added. This is what is referred to as a 'partial entry on add effect' and it manifests itself in that some (not all) of the added information may appear in results of a read. If this occurs, the read information is only partially correct. Conversely, there is also what is called a 'partial entry on remove effect', where during a remove operation in which rows are being removed from tables, a search is performed before this removal operation is complete. The information returned from the search may not include information that has been deleted (or information that will be deleted very shortly after the search). Similarly there is what is called a 'partial entry on modify effect' which is in effect a combination of add and remove operations as outlined above, where either attributes of a particular entry in a database are added or removed.

What is described above, is an effect that can otherwise be referred to as an 'update' problem, or a partial entry problem. There is yet another problem in the prior art, in what may be called a partial entry replication problem. This partial entry replication problem stems from the situation where there are two independent systems that are being replicated using a database replication technique. In such a replication environment, it is desirable to replicate anything that happens on a 'master' database system on one or more 'slave' database systems. So when an entry which has been added, deleted or modified on the master database system it is desirable to also replicate any add, remove or modify operations on the slave database systems.

One reason this partial entry replication is considered a problem, is that an update may be fast on the 'master' database system, but is typically considerably slower when replicating on the slave database systems. Thus, instead of taking milliseconds this replication may take seconds, depending on network traffic and the system configuration. With such delays, the partial entry replication problem can become quite noticeable to a user. Again, the problem is exacerbated if many updates are being done concurrently, which may be the case in a relatively large database.

SUMMARY

The present application provides, a method for improving the operational performance of a database (or database system). In one embodiment, the method includes determining whether an instruction or operation adds information to or removes information from the database. For an add operation, information is first added to an 'out' table used to retrieve objects (or entries) before the database is actually updated. For a remove operation, information is first removed from an 'in' table used to find objects (or entries) in the database. Preferably, for an add operation, the information is added to the 'in' table after the information is added to the 'out' table. Preferably, for a remove operation, information is removed from the 'out' table after the 'in' table.

According to the present application, when an add entry operation is performed, information is added to the entry table first, that is to the 'out' table, such that the information is not visible initially. The information is then added to the search table, that is the 'in' table, such that the information is visible and searchable so that all corresponding information can be retrieved. Thus, according to this embodiment of the present application, information to be added to a database is first prebuilt in a non-visible table before the information is made visible. As a result, if the information is searched prior to both 'in' and 'out' tables being completed, the 'in' table will not be active and the search returns a partially updated result. In other words, as rows are added to the 'in' table, the entry gradually becomes visible, and any search (on an 'in' table attribute) if found for a partially visible entry, the complete entry will be read.

The converse is true for a remove entry operation. For a remove entry operation information is removed from the 'in' table first and then the 'out' table. Thus the visibility is first removed and then the contents are removed.

In an X.500 directory system, directory terms for services (or operations) are called add entry (for adding information), remove entry (for deleting information), and modify entry (for modifying information).

In the instance of a replication operation, the present application forwards the replication information in the same order as entries are added, removed or modified, as described above. Thus if a master database system's 'in' table is first updated, this update may go into a replication queue so that the slave database system can be replicated in the same order as the master database system.

A Modify entry operation is a combination of add and remove. A modify entry operation is a collection of updates and is generally a sequence of changes, such as the addition of an attribute or value, or the removal of an attribute or value. So in the case of adding attributes or values, an "out" table/"in" table technique is used and when are removing attributes or values, the "in" table/"out" table technique is used. There may be zero or more add attribute, add value, remove attribute and/or remove value operations in a modify entry operation.

BRIEF DESCRIPTION OF THE DRAWINGS

The present embodiments will now be described with reference to the accompanying drawings in which.

DETAILED DESCRIPTION

In order to help illustrate an embodiment of the present application, reference is made to the disclosure of PCT/AU95/00560 (U.S. Ser. No. 08/793,575 filed May 22, 1997), both of which are herein incorporated by reference, which provide a more detailed description of the 'add entry', 'remove entry' and 'modify entry' operations for an X.500 directory system. It should be noted, however, that the present application is not limited to the directory system disclosed in PCT/AU95/00560 (U.S. Ser. No. 08/793,575 filed May 22, 1997), and can be used in conjunction with any database system having an 'in'/'out' table design.

In order to exemplify the present embodiments, the X.500 directory system operations identified above will be used. However, it will also be appreciated that the subject matter of the present application can be used in conjunction with other instructions (or operations) and database systems.

Add Entry Operation

An Add Entry operation is used to add a leaf entry (e.g., an object entry or an alias entry) to a Directory Information Tree (DIT). Table II below is an example of an X.500 Definition description.

TABLE II

| Argument | Description |
|---|---|
| Object | The Distinguished Name of the entry to be added |
| Entry | A set of attributes to add |
| Common Arguments | An optional set of controls to add |
| Result | |
| NULL | NULL |

Generally, the steps of the Add Entry operation are as follows:
  Using the DIT table, tree walk to the parent of the entry to be added (Parent ED).
  Using the DIT table, check if the entry exists (e.g., check for RDN=new RDN and PARENT=Parent EID).
  If the entry does not exist, allocate a new Entry Identifier (EID) and add the entry. Insert information into the DIT Table, the Name Table, the Tree Table, the Search Table, the Entry Table and, if it is an alias entry, the Alias Table.

An example of the process according to the present application for the Add Entry operation is outlined below.

EXAMPLE

The objective of this example is to add an object with the following attributes and values under an object with a distinguished name (DN) of "Datacraft/Marketing".
  surname [Delahunty]
  commonName [Mary]
  title [Marketing Manager]
  telephoneNumber [(03) 727-9523]

To achieve this objective, first obtain the EID for the base object DN using a TreeWalk. The EID of the base object is "12".

Using the DIT Table, look for a duplicate entry, i.e., PARENT=12 and RDN="MARY DELAHUNTY". In this example, no duplicates exist.

Add the following rows to the tables shown.

DIT

| EID | PARENT | ALIAS | RDN |
|---|---|---|---|
| 33 | 11 | 0 | MARY DELAHUNTY |

NAME

| EID | RAW |
|---|---|
| 33 | [Mary Delahunty] |

TREE

| EID | PATH |
|---|---|
| 33 | 1.12.21. |

SEARCH

| EID | AID | VID | DISTING | NORM |
|---|---|---|---|---|
| 33 | 0 | 0 | 0 | 2.5.6.7 |
| 33 | 3 | 0 | 1 | DELAHUNTY |
| 33 | 4 | 0 | 1 | MARY |
| 33 | 12 | 0 | 0 | MARKETING MANAGER |
| 33 | 20 | 0 | 0 | 03 727 9523 |

ENTRY

| EID | AID | VID | RAW |
|---|---|---|---|
| 33 | 0 | 0 | [2.5.6.7] |
| 33 | 3 | 0 | [Delahunty] |
| 33 | 4 | 0 | [Mary] |
| 33 | 12 | 0 | [Marketing Manager] |
| 33 | 20 | 0 | [(03) 727-9523] |

Figure 2:
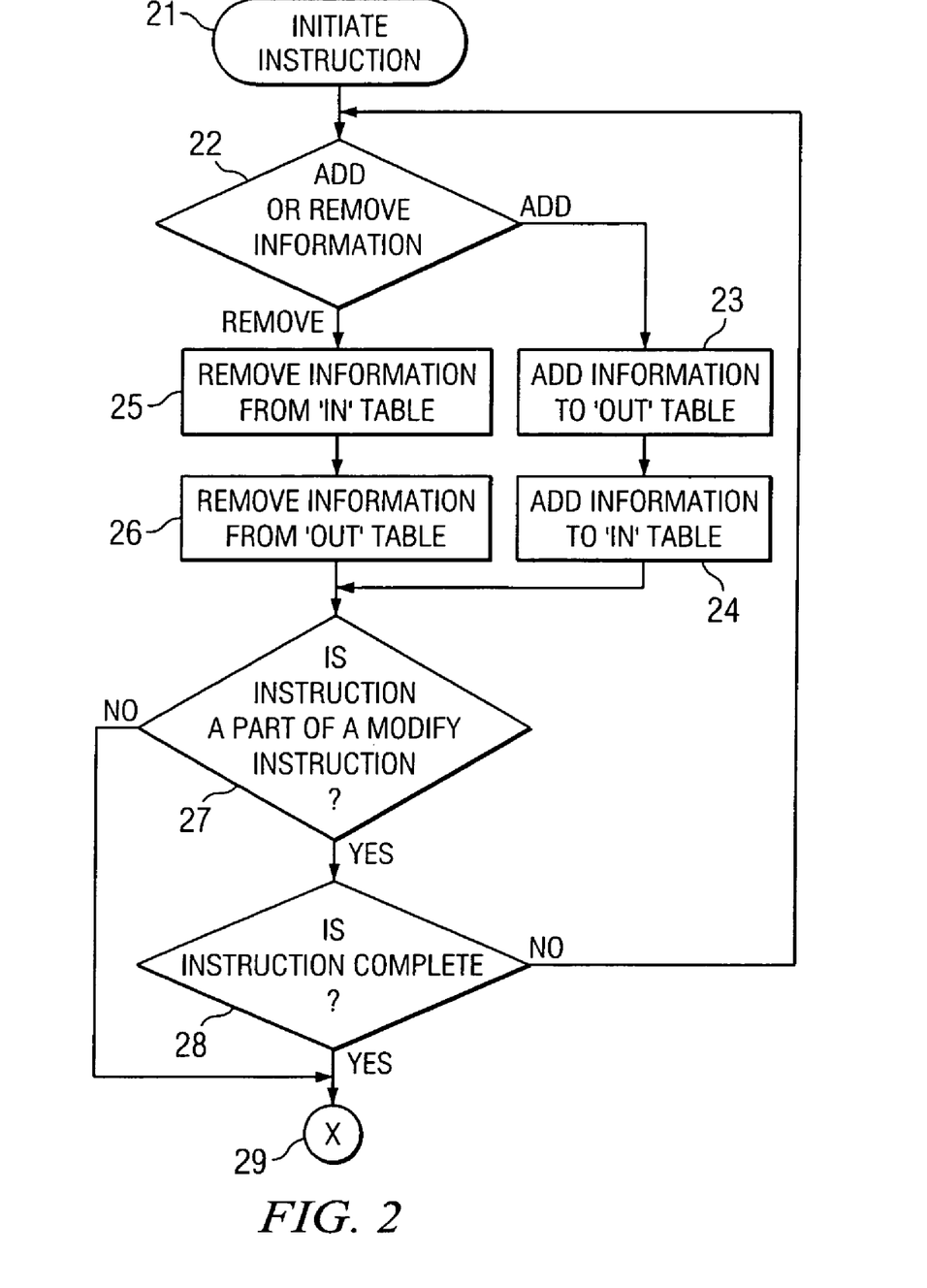
FIG. 2 illustrates an add, remove or modify entry operation in schematic form in accordance with an embodiment of the present application.

According to the present application, and referring to FIG. 2, an instruction (step 21) would first be checked as to whether it added or removed information (step 22). In this case, it would add information, and thus information would be added to 'out' table first (step 23), and thereafter added to the 'in' table (step 24). It can be thus seen that for an 'add entry' operation, 'out' tables are added to first, then 'in' tables. Thus, with reference to the above example, information would be added to the ENTRY and NAME tables first (which are 'out' tables) and thereafter added to the SEARCH, DIT and TREE tables (which are 'in' tables).

Remove Entry Operation

A Remove Entry operation is used to remove a leaf entry (either an object entry or an alias entry) from the Directory Information Tree (DIT). Table III below is an example of an X.500 Definition description.

TABLE III

| Argument | Description |
|---|---|
| Object | The Distinguished Name of the entry to be deleted |
| Common Arguments | An optional set of controls to add |
| Result | |
| NULL | NULL |

Generally, the steps of the Remove Entry operation are as follows:
  Perform a tree walk using the DIT table, to obtain the EID of the base object
  If the entry exists, and it is a leaf entry, then for the condition EID=EID of the selected object, delete information from the DIT Table, the Name Table, the Tree Table, the Search Table, the Entry Table and, if it is an alias entry, the Alias Table.

An example of the process according to the present application for the Remove Entry operation is described below.

EXAMPLE

The objective of this example is to remove (or delete) an object with a distinguished name (DN) of "Datacraft/Marketing/Mary Delahunty."

To achieve this object obtain the EID for the base object DN using a TreeWalk. The EID of the base object is "21". Check that no entries have PARENT=21. Delete all rows added to the DIT Table, the Name Table, the Tree Table, the Search Table and the Entry Table (refer to Add Entry example above) where EID=21.

According to the present application, and referring again to FIG. 2 an instruction (step 21) would first be checked as to whether it added or removed information (step 22). In this case, it would remove information, and thus information would be removed from the 'in' table first (step 25), and thereafter removed from the 'out' table (step 26). It can be thus seen that for a 'remove entry' operation, 'in' tables are removed from first, then 'out' tables. Thus, with reference to the above example, information would be deleted from SEARCH, DIT and TREE tables (which are 'in' tables) first and thereafter deleted from the ENTRY and NAME tables (which are 'out' tables).

Modify Entry Operation

A Modify Entry operation is used to perform one or more of the following modifications to a single entry in the database. Table IV below is an example of an X.500 Definition description.

TABLE IV

| | Description |
|---|---|
| Argument | |
| Object | The Distinguished Name of the entry to be modified |
| Changes | A list of modifications |
| Common Arguments | An optional set of controls to add |
| Result | |
| NULL | NULL |

Generally, the steps of the Modify Entry operation are as follows:
  Perform a tree walk using the DIT table, to obtain the EID of the selected object.
  For the selected object, perform one or more of the following actions: Add Value, Delete Value, Add Attribute, Delete Attribute in accordance with the method of the present application described above.

The operations required for each action are as follows:
  Add Value
    If the attribute exists, add the value to the Entry Table first, i.e., the "in" table, and thereafter the Search Table, i.e., the "out" table. A check is made to determine whether the attribute is single valued or multi-valued for an existing value. If the attribute is multi-valued a check for a duplicate value is then made. If a duplicate value is found, then the attribute value is not added.
  Delete Value
    If the value exists, the value is deleted from the Search Table (e.g., the "out" table) first, and thereafter deleted from the Entry Table (e.g., the "in" table). Preferably, a Distinguished Name value is not deleted.
  Add Attribute
    If the attribute does not exist, add the Attribute Values to the Entry Table (e.g., the "in" table) first and thereafter to the Search Table (e.g., the "out" table).
  Delete Attribute
    For the Entry Table and the Search Table, if the attribute exists, delete it from the Search table first, and thereafter delete it from the Entry table. Preferably, values with AID=attr and EID=base object are deleted, and Naming attributes are not deleted.

EXAMPLE

An example of the Modify operation is described below:
The objective of this example is to modify the entry "Datacraft/Sales/Network Products/Chris Masters" with the following changes:
  Delete Attribute and Value telephoneNumber 018-042 671
  Modify Attribute and Value title Sales Assistant The Search and Entry Tables below reflect the changes.

| SEARCH | | | | |
|---|---|---|---|---|
| EID | AID | VID | DISTING | NORM |
| 30 | 0 | 0 | 0 | 2.5.6.7 |
| 30 | 3 | 0 | 1 | CHRIS |
| 30 | 4 | 0 | 1 | MASTERS |
| 30 | 12 | 0 | 0 | SALES ASSISTANT |
| 30 | 20 | 0 | 0 | 03 727 9456 |

| ENTRY | | | |
|---|---|---|---|
| EID | AID | VID | RAW |
| 30 | 0 | 0 | [2.5.6.7] |
| 30 | 3 | 0 | [Chris] |
| 30 | 4 | 0 | [Masters] |
| 30 | 12 | 0 | [Sales Assistant] |
| 30 | 20 | 0 | [(03) 727-9456] |

Figure 3:
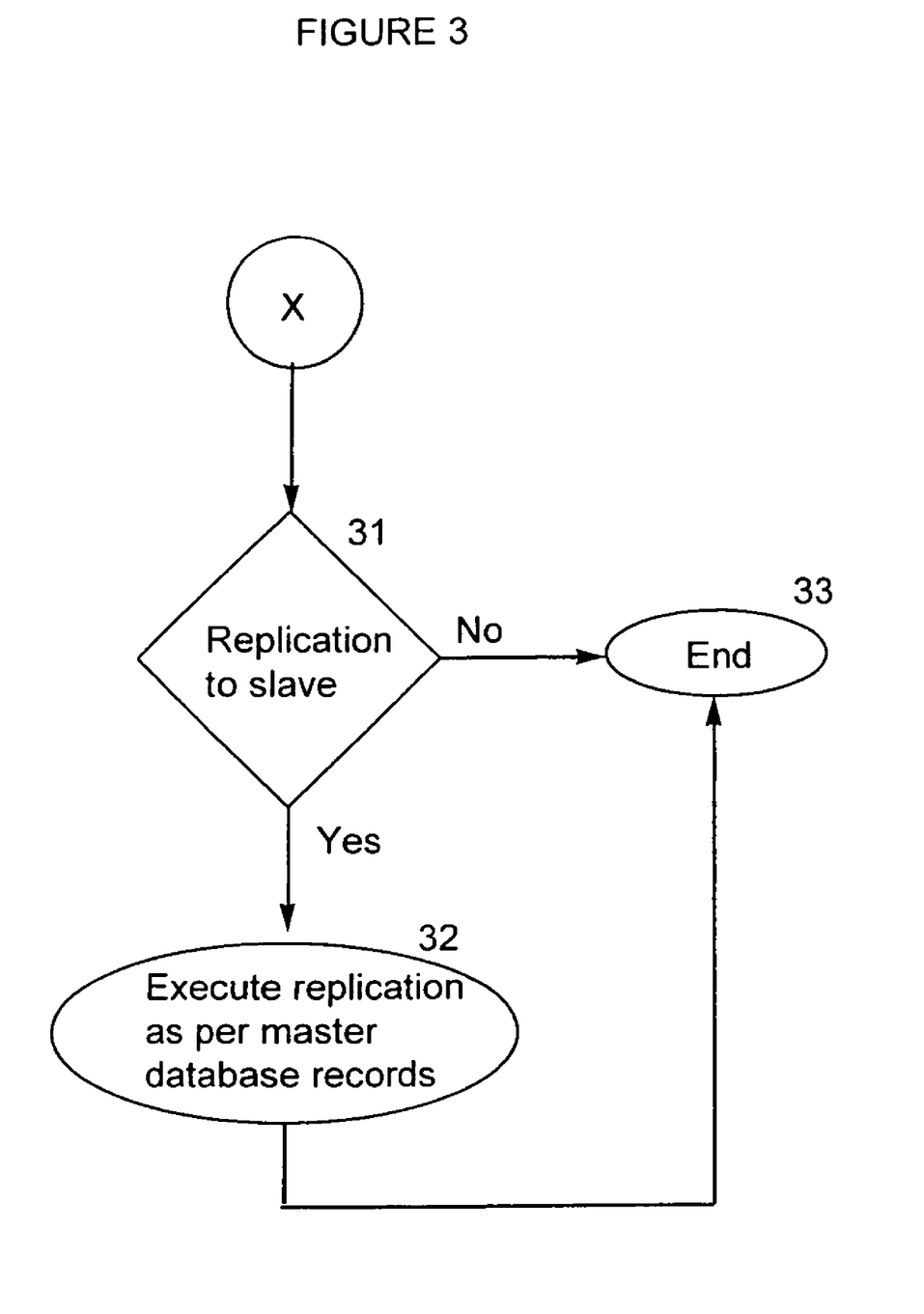
FIG. 3 illustrates a replication sequence in schematic form in accordance with the present invention.

In accordance with one embodiment of the method of the present application, the Modify Entry operation would be performed as follows:
  adding a new attribute: add attribute to an 'out' table, such as the ENTRY table first, then add to 'in' tables, such as the SEARCH table. This would be accomplished in accordance with the sequence illustrated above with reference to FIG. 2 relating to 'add entry'. The process as represented in FIG. 2, would then determine if the instruction is a part of a 'modify' instruction (step 27), and as this is the case, would further determine if the instruction is complete (step 28), which at this stage it is not, and thus return to 22 for the next part of the sequence.
  removing an attribute: remove an attribute from 'in' tables, such as the SEARCH table, first and then remove the attribute from the 'out' tables, such as ENTRY and NAME tables. Once the add or remove operations are completed, a determination is made of whether an instruction is part of a modify instruction (step 27) and if "yes" the process returns to step 22 to perform the next add or remove entry operation.

adding attribute values: add attribute values to an 'out' table, such as the ENTRY table, first and then add the attribute value to the 'in' tables, such as the SEARCH table. Once the attribute values are added, a determination is made of whether an instruction is part of a modify instruction (step 27) and if "yes" the process returns to step 22 to perform the next add or remove entry operation.

removing attribute values: remove attribute values from 'in' tables, such as the SEARCH table, first and then remove the attribute values from the 'out' tables, such as the ENTRY table. A determination is again made of whether an instruction is part of a modify instruction (step 27). At this stage, a 'no' determination is made and the process ends (steps 31 and 33 in FIG. 3).

Some directory protocols define an attribute 'replace' operation. This can be performed by a sequence of a delete and an add operation. It is also to be noted that the present application has general application, and the embodiments described are illustrative only and not the only forms of implementing the present invention.

Database System Replication

In the case of replication from master database system to one or more slave database systems, the present application calls for a sequence of operations, e.g., add entry, remove entry and/or modify entry, to be executed in the slave database systems in the same sequence as they were executed to update the master database system. Thus, referring to FIG. 3, whether a replication procedure is required is determined at step 31, and if it is, the replication is executed (step 32) in accordance with the master database records, or records of the master database sequence (if not stored on the master database). Accordingly, the records of the master database sequence of operations is obtained or accessed and the replication is performed. This information is passed on to the slave database systems and executed in the slave database systems during a replication procedure. At the end of the replication sequence, the procedure ends (step 33).

Whilst there are a number of examples given in this specification, it is to be noted that the system and method of the present application should not be limited to only those operations as exemplified. The present application can be applied to numerous operations or instructions based on the out/in or in/out technique as disclosed above.

Equally, the present application, although described in relation to a table structure as disclosed in PCT/AU95/00560 (U.S. Ser. No. 08/793,575 filed May 22, 1997) is equally applicable to any type of table structure that separates 'in' (searchable attributes) from 'out' (information that can be retrieved). The present invention relates to the method/apparatus used to execute instructions or operations, or the structure upon which the operations or instructions are executed.

I claim:

1. A method for amending a database system, the method comprising:
   determining, using a processor, whether an instruction or operation adds an information entry to or removes the information entry from a database system; and
   amending, in accordance with the instruction or operation, the database system, using the processor, by adding the information entry to or removing the information entry from the database system, wherein:
      adding the information entry comprises first adding the information entry to an 'out' table in the database system; and
      removing the information entry comprises first removing the information entry from an 'in' table in the database system, the 'in' table comprising the information entry in a normalized format, the 'out' table comprising the information entry in a raw format, the instruction implemented via a directory system comprising X.500 or LDAP.

2. The method as claimed in claim 1, wherein the information entry is added to the 'in' table after being added to the 'out' table.

3. The method as claimed in claim 1, wherein the information entry is removed from the 'out' table after being removed from the 'in' table.

4. The method as claimed in claim 1, further comprising performing one entry operation of the plurality of add and remove entry operations if the instruction or operation is determined to be part of the modify entry instruction.

5. The method as claimed in claim 1, further comprising using the 'out' table to retrieve a result of the search of the 'in' table.

6. The method as claimed in claim 1, wherein the information entry in the raw format is provided as a result of a search for the information in the normalized format.

7. The method as claimed in claim 1, wherein the information entry in the raw format includes the information entry as initially inputted in the database system, and wherein the information entry in the normalized format includes a searchable modification of the information entry as initially inputted in the database system.

8. A system for amending a database system, the system including:
   a database using a plurality of tables, each table having a plurality of rows and columns, and storing arbitrary data;
   a computer-readable medium;
   means, encoded in the computer-readable medium, for processing an instruction or operation by determining whether the instruction or operation adds an information entry or removes the information entry from a database system; and
   means, encoded in the computer-readable medium, for amending, in accordance with the instruction or operation, the database system by adding the information entry to or removing the information entry from the database system, wherein:
      adding the information entry comprises first adding the information entry to an 'out' table in the database system; and
      removing the information entry comprises first removing the information entry from an 'in' table in the database system, the 'in' table comprising the information entry in a normalized format, the 'out' table comprising the information entry in a raw format, the system being a directory services system comprising X.500 or LDAP.

9. The system as claimed in claim 8, further including means for using the 'out' table to retrieve a result of the search of the 'in' table.

10. The system as claimed in claim 8, wherein the information entry in the raw format is provided as a result of a search for the information in the normalized format.

11. The system as claimed in claim 8, wherein the information entry in the raw format includes the information entry as initially inputted in the database system, and wherein the information entry in the normalized format includes a searchable modification of the information entry as initially inputted in the database system.

* * * * *

UNITED STATES PATENT AND TRADEMARK OFFICE
CERTIFICATE OF CORRECTION

PATENT NO. : 7,624,096 B1  Page 1 of 1
APPLICATION NO. : 09/721639
DATED : November 24, 2009
INVENTOR(S) : Richard Hans Harvey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-sixth Day of October, 2010

David J. Kappos
*Director of the United States Patent and Trademark Office*